United States Patent [19]

Sailer et al.

[11] Patent Number: 4,667,798
[45] Date of Patent: May 26, 1987

[54] FORCED-COOLING FRICTION BRAKE OR CLUTCH

[75] Inventors: Hubert Sailer, Markdorf; Josef Dietenberger, Aulendorf; Friedrich J. Ehrlinger, Friedrichshafen, all of Fed. Rep. of Germany

[73] Assignee: Zahnfabrik Friedrichshafen AG, Friedrichshafen, Fed. Rep. of Germany

[21] Appl. No.: 860,667

[22] Filed: May 7, 1986

Related U.S. Application Data

[63] Continuation-in-part of Ser. No. 647,771, Sep. 5, 1984, Pat. No. 4,624,353.

[30] Foreign Application Priority Data

Sep. 5, 1983 [WO] PCT Int'l Appl. ............... PCT/EP83/00232

[51] Int. Cl.$^4$ .............................................. F16D 13/60
[52] U.S. Cl. .............................. 192/70.12; 192/113 B; 188/264 D
[58] Field of Search ...................... 192/70.12, 113 B; 188/264 D, 264 B, 264 R

[56] References Cited

U.S. PATENT DOCUMENTS 2,869,701  1/1959  Yokel ................... 192/113 B X
3,292,758 12/1966  Polak .
4,270,647  6/1981  Leber .
4,527,681  7/1985  Sommer ...................... 192/52

FOREIGN PATENT DOCUMENTS 0106594  4/1984  European Pat. Off. .
0143898  6/1985  European Pat. Off. .
2802676  8/1979  Fed. Rep. of Germany .

Primary Examiner—George H. Krizmanich
Attorney, Agent, or Firm—Karl F. Ross; Herbert Dubno

[57] ABSTRACT

A forced cooling friction brake or clutch apparatus which has a plate stack of interleaved plates including at least one plate rotatable with a shaft and axially shiftable thereon, and at least one plate axially shiftable on a housing. A pressure plate is axially juxtaposed with the stack and axially shiftable on the housing and defines a pressurizable compartment which can be subjected to fluid pressure to urge the pressure plate against the stack. An annular carrier on the shaft inwardly of the stack engages plates of the stack rotatable with the shaft, the carrier having an annular cavity opening axially to one side thereof and being formed with radial passages communicating with the cavity and opening toward the stack. A coolant channel is formed in the housing and opens toward the side of the carrier and into the cavity for delivering a forced flow of a coolant thereto. A plurality of open-ended tubular members extend parallel to an axis of the shaft and arrayed around the axis, the pressure plate having an inwardly extending collar juxtaposed with the open side of the cavity and engaging the tubular members for axial entrainment thereof by the collar upon movement of the pressure plate toward the stack, one end of each of the tubular members opening toward the cavity, the housing having a radial wall formed with a respective bore receiving each of the tubular members and defining the channel with coolant feeders in the wall communicating with the bores and a coolant inlet communicating with the coolant feeders, another end of each of the tubular members blocking coolant flow through the tubular members in the initial position of the pressure plate.

7 Claims, 2 Drawing Figures

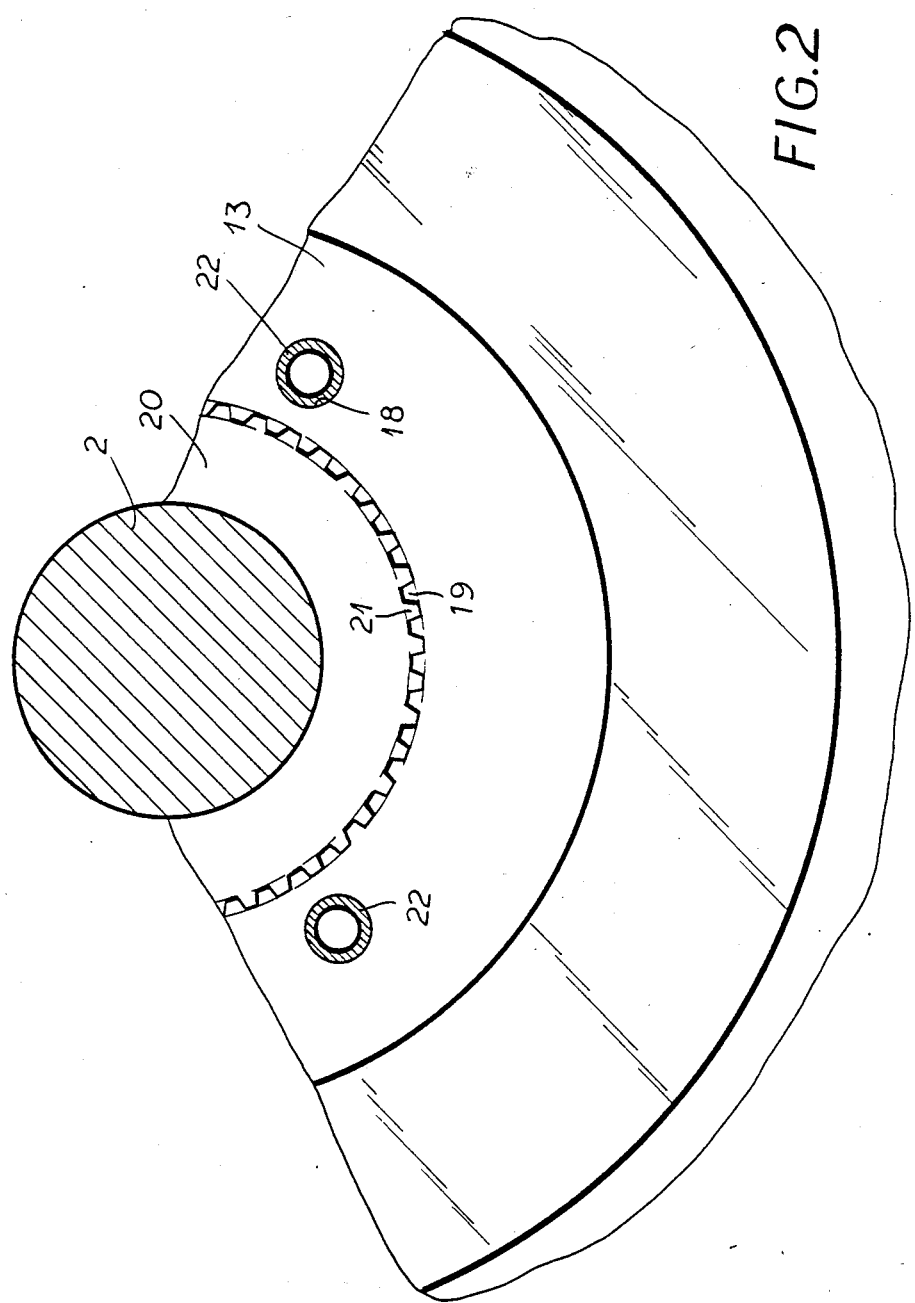

FORCED-COOLING FRICTION BRAKE OR CLUTCH

CROSS REFERENCE TO RELATED APPLICATION

The present application is a Continuation in Part of Ser. No. 647,771 now U.S. Pat. No. 4,624,353, filed as a National Phase application on Sept. 5, 1984 of the PCT/EP83/00232 of Sept. 5, 1983.

FIELD OF THE INVENTION

Our present invention relates to friction brakes and clutches and, more particularly, to a friction device of the stacked plate type which is provided with forced cooling in a loaded situation.

BACKGROUND OF THE INVENTION

As is apparent from the aforementioned copending application, stacked plate friction devices generally comprise a shaft rotatable in a housing, each being coupled to one or more plates of a stack of interleaved axially shiftable plates which can be pressed by a pressure plate in the housing against a counter surface of the latter when actuation of the brake or the clutch constituting the friction device is desired.

German Patent document DE-PS No. 2802 676 describes a forced cooling friction device of this type which is provided with means for controlling the coolant flow to a cavity of a plate carrier on the shaft from which the coolant flows radially outwardly into the stack, a control means being provided to regulate this flow so that in the inoperative position of the pressure plate the flow is blocked, but with displacement of the pressure plate to compress the stack, the flow is generated to follow the loading of the friction device.

In this system, however, the flow of the coolant is effected through the shaft which requires control of the outflow in the region of the shaft surrounded by the stack and the carrier. It has been found that this construction is impractical because sealing difficulties arise from the tolerance problems which result from having the coolant oil passages in the shaft, i.e. a rotary element.

Furthermore, because of the fact that the passages are provided in the rotary shaft, the supply of the coolant fluctuates in accordance with the speed of the device which is often a handicap.

Finally, it has been found, with such systems, that the supply of the coolant oil differs from plate to plate along the stack because of the use of an obstructive formation to control the flow and this is, of course, undesirable. Indeed this arrangement has other problems which make it unreliable including interference uniform to outflow of the cooling oil.

These problems are not eliminated in other cooling systems for friction devices, for example, in EPS No. 143898, the use of large brake disks with a number of large passages between the friction lining and the inner plate carrier is proposed, but this not only inordinately increases the cost for the plates, but also gives rise to increased oil spraying and uncontrolled cooling oil flow so that the lining wear is nonuniform.

Coaxial cooling oil passages are eliminated in the plates themselves in the system of U.S. Pat. No. 4,529,073 in which a cavity or chamber or compartment is provided as in the German Patent document No. 2802676 as a coolant oil collector before the coolant oil is permitted to flow into the plate stack. However, in this arrangement, the control valve is also in a rotating member, i.e. a rotating drum, and this operates with an undesired speed dependency so that its operation is not coordinated with the small movements of the brake pressure plate.

OBJECTS OF THE INVENTION

It is, therefore, the principal object of the present invention to provide a forced cooling friction device which eliminates the problems with speed responsive units such as that of German Patent document No. 2802676, and also provide a more accurate and efficient forced cooling of the friction braking surfaces when such cooling is required.

Another object of our invention is to provide an economical arrangement for controlling the cooling flow to a plate stack of a friction device which is independent of speed and dependent exclusively upon the position of the pressure plate of the device.

Still another object of this invention is to provide a forced cooling system which will minimize or eliminate cooling oil flow in the initial or inoperative position of the pressure plate, but which will also ensure a more uniform flow of the coolant to the plates to the stack and more rapid removal of heated oil from the stack than has been the case heretofore.

SUMMARY OF THE INVENTION

These objects and others which will become more apparent hereinafter and are attained in accordance with the present invention in a friction device of the type described in which the coolant flow control members are tubes which axially traverse the pressure plate and are coupled therewith with lost motion so that they can be entrained by the pressure plate when the latter is displaced from its inoperative position toward the stack. The tubular members extend axially in an array which is coaxial with the shaft and consists of a number of such members equispaced around the shaft.

The members are axially shiftable in a radially extending portion of the housing which is thus stationary and opens directly into the cavity of the stack carrier.

More specifically, the invention comprises:

a forced cooling friction brake or clutch apparatus comprising:

a housing;

a shaft rotatable in the housing:

a plate stack of interleaved plates including at least one plate rotatable with the shaft and axially shiftable thereon, and at least one plate axially shiftable on the housing;

a pressure plate axially juxtaposed with the stack and axially shiftable on the housing and defining a pressurizable compartment which can be subjected to fluid pressure to urge the pressure plate against the stack, the housing being formed with a support surface juxtaposed with the stack on a side thereof opposite the pressure plate;

an annular carrier on the shaft inwardly of the stack and engaging plates of the stack rotatable with the shaft, the carrier having an annular cavity opening axially to one side thereof and being formed with radial passages communicating with the cavity and opening toward the stack;

a coolant channel formed in the housing and opening toward the side of the carrier and into the cavity for delivering a forced flow of a coolant thereto; and means on the housing cooperating with the channel and coupled with the pressure plate for blocking flow from the channel to the cavity in an initial position of the pressure plate and for and for permitting flow from the channel to the cavity upon movement of the pressure plate from the initial position as the pressure plate compacts the stack and in dependence upon the loading thereof, said means including:

a plurality of open-ended tubular members extending parallel to an axis of the shaft and arrayed around the axis, the pressure plate having an inwardly extending collar juxtaposed with the open side of the cavity and engaging the tubular members for axial entrainment thereof by the collar upon movement of the pressure plate toward the stack, one end of each of the tubular members opening toward the cavity, the housing having a radial wall formed with a respective bore receiving each of the tubular members and defining the channel with coolant feeders in the wall communicating with the bores and a coolant inlet communicating with the coolant feeders, another end of each of the tubular members blocking coolant flow through the tubular members in the initial position of the pressure plate.

The fact that the tubular members are engaged in a piston-like movement in respective axial boards of the housing wall and can seat at their ends remote from the stack against the endwall of the respective bore in a valve-like seating action, ensures that in the absence of a predetermined braking stroke there will be no significant flow of the coolant to the stack. By selection of the number of plates and the number of tube members disposed about the axis of the shaft in accordance with the number of plates or by altering the inner diameter of the tube members, various coolant flow rates can be established with precision and the distribution of the coolant flow can be established with precision for the specific braking action required.

Because the oil supply can be dimensioned to suit the heat generation of the brake, the hub of the plate carrier can be practically free from passages apart from the radial bores which provide an especially intensive cooling without flow interruptions caused by rotating elements since the passages are in continuous communication with the cavity and the space containing the plates.

According to a feature of the invention, the tubular members are biased by springs against the radial endwalls of the bores and are axially shiftable in the bores while being sealed relative to the latter. This allows the outer contour of the tubular member, because of its piston-like configuration, to be biased by the cooling oil pressure against the force of the springs because of a cross-section reduction which can be either conical or stepped, in the direction of the end wall of the bore. Here hydraulic forces assist in displacing the tubular members as they are lifted from engagement with the endwall.

The tubular members between the collar of the pressure plate and the axial bores in which the tubular members are slidable are stepped to engage the springs which can be seated against a shoulder in the bore and the brake pressure plate so that the springs press the tubular members against the endwalls of the bores even before the pressure plate reaches its initial position.

This guarantees that the flow of coolant will be cutoff in the inoperative position of the brake or clutch in spite of tolerance variations in fabrication and stroke which might otherwise delay cutoff of the flow when the pressure plate reaches its initial position. In practice, this avoids drag moments of the cooling oil or the plates because of undesirable leakage flows.

According to another feature of the invention, the aforementioned cavity within the friction plate stack has an axial boundary formed by a radial web whose cavity-defining flask is rounded to deflect the oil flow from the axial boundary provided by the tubular members into the radial outflow through the passages without spattering or spraying. These passages open between the teeth of the carrier on which the plates entrained with the shaft are keyed, the cavity being further defined by an inwardly extending lip or flange juxtaposed with the curved flank.

This has been found to provide an especially uniform flow of coolant to the stack without the drawbacks of centrifugally dependent control valves.

According to yet another feature of the invention, the stack is surrounded by an annular passage in the form of a gap between the pressure plate and the counter surface previously described, in which the oil is collected from the stack and conducted to an outlet through the aforementioned radial wall.

Furthermore, between the outer periphery of the brake pressure plate and the housing, a stepped annular cylinder is provided which has a radial inlet for supplying the pressure fluid driving the pressure plate against the stack. This passage can be crossed by the outlet which extends axially.

This has been found to permit extremely rapid outflow of the coolant which, of course, means that the cooling effect in the stack and the brake pressure plate is increased, while the pressure inlets and coolant outlet can be formed directly in the wall of the housing without being reinforced with tubing or piping.

BRIEF DESCRIPTION OF THE DRAWING

The above and other features, objects and advantages of the present invention will become more readily apparent from the following description, reference being made to the accompanying drawing in which;

FIG. 2 is a section taken generally along the line II—II of FIG. 1.

SPECIFIC DESCRIPTION

Figure 1:
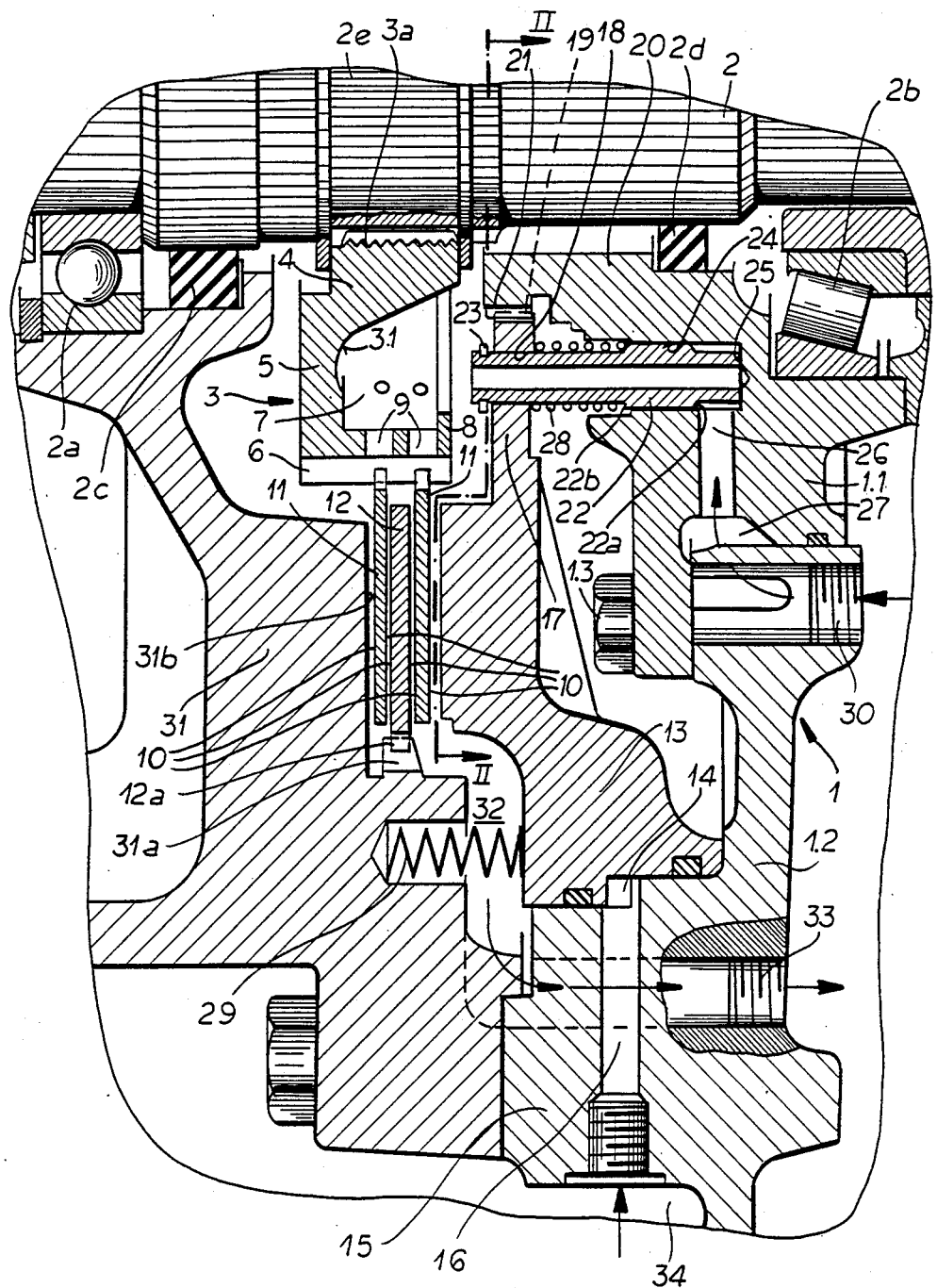
FIG. 1 is a fragmentary axial section through a friction brake or clutch according to the invention which is practically free from drag moments in an inoperative position of the pressure plate.

The friction device shown in the drawing is a brake for automotive vehicle purposes and can be used for wheel transmissions, for clutches and the like.

In the drawing, we have shown a radial housing end wall 1 of a housing into which a shaft 2 extends and in which the shaft or the transmission members associated therewith are journaled in bearings 2a and 2b for example, and which can be sealed against the scope of the coolant by shaft seals 2c and 2d.

A plate carrier 3 is rotationally fixed to the shaft 2 and can have teeth 3a which engage in splines 2e of the shaft for this purpose.

The plate carrier 3 comprises a hub 4 formed with a radial web 5 terminating in an externally toothed ring on which plates 11 of a plate stack are keyed.

The plate carrier 3 is formed with an axially open annular cavity 7 defined in part by a curved flank 3.1 extending to the radial wall 5 and in part by an inwardly directed lip or flange 8. From this cavity, radial passages 9 deliver the coolant oil 2 to the friction surfaces 10 of the plate stack 11, 12. The bores 9 are uniformly distributed over the periphery of the plate carrier 3 Plate 12 represents a plate of the stack which is axially shiftable by its teeth 12a or the teeth 31a of a housing portion 31 whose annular support surface 31b is juxtaposed with the plate stack.

The plate stack can be compressed axially against the housing portion 31 by brake pressure plate 13 which defines a pressurizable compartment in the form of a stepped cylinder 14 with the radial wall 1 and the housing wall 15. A radial inlet 16 communicates with the stepped cylinder to pressurize the latter and drive the brake pressure plate 13 axially against the stack. As is well known, the axial pressure brings the friction surfaces into engagement to a greater or lesser extent and thereby reduces the relative speed between shaft 2 and the housing.

The inner portion of the brake pressure plate 13 is formed with a radially extending inner collar 17 traversed by axial bores 18.

The collar is formed with internal teeth 19 which engage the external teeth 20 on a housing wall portion 1.1 which has an axially extending cantilevered annular shoulder 20 closely surrounding the shaft and which can be axially thrust thereover. Bolts 1.3 of which only one is visible, connect the housing portion 1.1 to the housing portion 1.2.

Short tube members 22 are slidably received in axial bores 24 formed in the housing portion 1.1 and in the axial bores 18 of the collar 17, a lock ring 23 forming a lost motion in communication with the brake pressure plate 13 such that, when the brake pressure plate 13 is moved to the left, it abuts the rings 23 and entrains the tubular members 22 to the lift to thereby open the coolant flow valves formed by each tubular member.

The ends of the tube members 22 oppsite the brake pressure plate 13 engages the wall 1.1. at annular seating surfaces 25 sealing the bores 24. The tube members 22 are stepped to form shoulders 22a and 22b, the former serving as a pressure surface tending to bias the tubular members to the left while the latter forms a seat for a respective coil spring 28 surrounding the tubular member and braced against the plate 14. The spring serves to press the tubular member into its sealing position even before the brake pressure plate 13 comes to rest in its right-hand position. The spring also serves to hold the tubular member in a sealing relationship with the end wall of the bore in the event fabrication tolerance might not permit such seating effectively otherwise.

Each of the bores 24 communicates with a radial coolant feeder 26 supplied by a manifold passage 27 with which the inlet port 30 communicates. Feeder 26 and the manifold passage 27 and inlet port 30 form a coolant channel opening into the cavity F via the tubular members 22.

The displacement of the pressure plate 13 into its initial position is effected by spring 29 spaced upon and around the plate stack and only one of which is visible in FIG. 1.

The outflow of the coolant from the plate stack is effected via an annular gap 32 between brake pressure plate 13 and housing portion 31. The outlet port 33 extends axially and crosses the port 16.

The pressure inlet 34 is thus completely independent of the cooling flow inlet 30, the inlet 34 being provided in the cylindrical wall.

In operation, the brake pressure plate 13 is shifted to the left by pressurization from inlet 16, it entrains the members 22 to permit the coolant to flow axially through these members into the cavity 7 from which the web can differ outwardly 4 the passes radially through the passages 9. The uninterrupted coolant flow contains the parts of the stack uniformly and the heated coolant collected in the gap or gap compartment 32 is discharged to the cooler via the outlet 33.

We claim:

1. A forced cooling friction mechanism comprising:
   a housing;
   a shaft rotatable in said housing;
   a plate stack of interleaved plates including at least one plate rotatable with said shaft and axially shiftable thereon, and at least one plate axially shiftable on said housing;
   a pressure plate axially juxtaposed with said stack and axially shiftable on said housing and defining with said housing a pressurizable compartment which can be subjected to fluid pressure to urge said pressure plate against said stack, said housing being formed with a support surface juxtaposed with said stack on a side thereof opposite said pressure plate;
   an annular carrier on said shaft inwardly of said stack and engaging plates of said stack rotatable with said shaft, said carrier having an annular cavity opening axially to one side thereof and being formed with radial passages communicating with said cavity and opening toward said stack;
   a coolant channel formed in said housing and opening toward said side of said carrier and into said cavity for delivering a forced flow of a coolant thereto; and
   means on said housing cooperating with said channel and coupled with said pressure plate for blocking flow from said channel to said cavity in an initial position of said pressure plate and for permitting flow from said channel to said cavity upon movement of said pressure plate from said initial position as said pressure plate compacts said stack and in dependence upon the loading thereof, said means including:
   a plurality of open-ended tubular members extending parallel to an axis of said shaft and arrayed around said axis, said pressure plate having an inwardly extending collar juxtaposed with the open side of said cavity and engaging said tubular members for axial entrainment thereof by said collar upon movement of said pressure plate toward said stack, one end of each of said tubular members opening toward said cavity, said housing having a radial wall formed with a respective bore receiving each of said tubular members and defining said channel with coolant feeders in said wall communicating with said bores and a coolant inlet communicating with said coolant feeders, another end of each of said tubular members blocking coolant flow through said tubular members in said initial position of said pressure plate.

2. The forced cooling friction mechanism defined in claim 1 wherein each of said tubular members is biased toward a respective endwall of the respective bore by a respective spring surrounding the tubular member and braced against said pressure plate.

3. The forced cooling friction mechanism defined in claim 2 wherein said tubular members form lost-motion connections with said pressure plate whereby said springs press said members against said endwalls before said pressure plate reaches said initial position upon depressurization of said stack.

4. The forced cooling friction mechanism defined in claim 1 wherein said cavity is defined by a curved contour extending from an axial region to a radial region to deflect said coolant smoothly without spray-creating edges to said passages, and an inwardly extending flange opposite said contour.

5. The forced cooling friction mechanism defined in claim 1, further comprising an outer gap compartment formed outwardly of said stack for collecting coolant therefrom, and a coolant outlet connected to said annular gap compartment.

6. The forced cooling friction mechanism defined in claim 5 wherein said pressure plate defines a fluid-pressurizable cylinder forming said pressurizable compartment in said housing, further comprising an inlet communicating with said cylinder for delivering a pressure fluid thereto.

7. The forced cooling friction mechanism defined in claim 6 wherein said inlet extends radialls and crosses said outlet which extends axially.

* * * * *

UNITED STATES PATENT AND TRADEMARK OFFICE
CERTIFICATE OF CORRECTION

PATENT NO. : 4,667,798
DATED : May 26, 1987
INVENTOR(S) : Hubert SAILER et al

It is certified that error appears in the above-identified patent and that said Letters Patent is hereby corrected as shown below:

Item [73] Assignee's name is to read:

-- ZAHNRADFABRIK FRIEDRICHSHAFEN AG --.

Signed and Sealed this

First Day of December, 1987

*Attest:*

DONALD J. QUIGG

*Attesting Officer*      *Commissioner of Patents and Trademarks*